United States Patent Office 2,890,523
Patented June 16, 1959

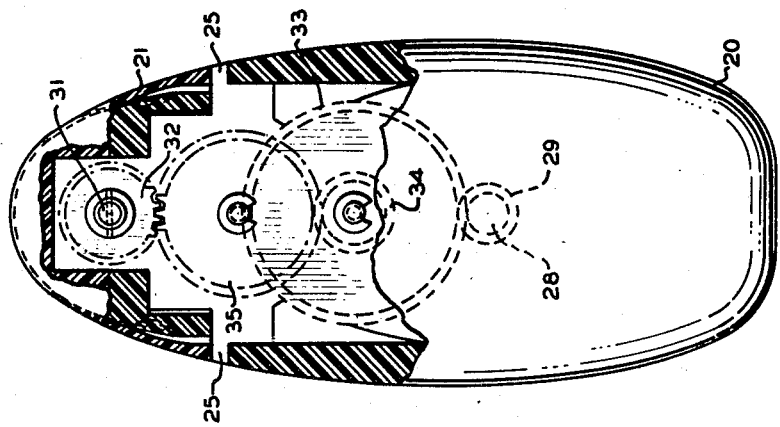

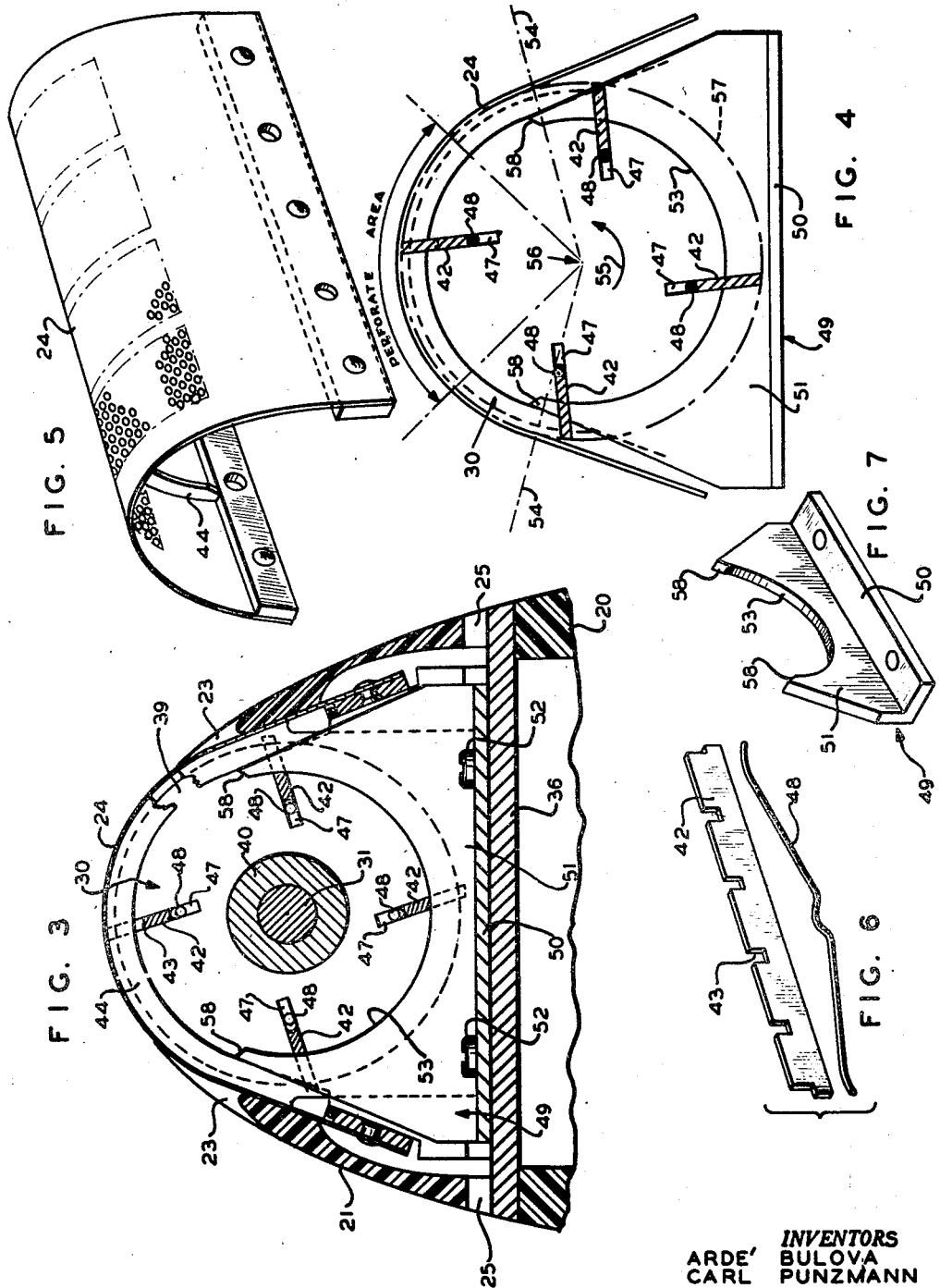

2,890,523

ELECTRIC SHAVERS HAVING BLADE GUIDING MEANS

Ardé Bulova, New York, and Carl Punzmann, Rego Park, N.Y., assignors to Bulova Watch Company, Inc., Flushing, N.Y., a corporation of New York Application February 14, 1957, Serial No. 640,110

3 Claims. (Cl. 30—43)

This invention relates to instruments generally identified in the trade as electric shavers, and applies more especially to such shavers wherein the blade has, or blades, when more than one is incorporated, have motion in the direction of the circumferential curve of the grill. The invention is primarily applicable to the type of shaver which employs a rotor having blades revolved about the axis of the rotor and for part of the rotating cycle have shearing contact with a curved grill. It has been found in practice that transition of the blade into contact with the grill and off of it again at the completion of its sweep across the grill has a detrimental effect. Since the blades are spring-loaded so as to maintain shearing contact with the grill during sweep thereacross, they tend to move radially outward at the completion of such sweep and on the return cycle thump against the grill when starting the next sweep. The resultant noise and wear are both seriously objectionable.

Fundamentally, the invention is directed to overcoming the deleterious effect of the transition of the blades onto and off of the grill during their repetitious rotative cycles of operation.

Likewise of general purport, the invention is directed to obtaining smoother transition of the blades onto and off of the grill at the beginning and ending of their sweep across the grill.

More specifically, a feature of the invention is to maintain the blades within close tolerances of radial movement throughout their rotative cycles and yet to maintain adequate spring pressure and shearing contact of the blades with the grill throughout the sweep of the blades across said grill.

A further objective, with utilization of such radially movable and spring-loaded blades, is to provide for guiding action and retention for promoting smooth transition and minimum radial movement of the blades during their cycle of rotation.

Furthermore, in utilization of blades of the character indicated, the invention avoids inclusion of the grill as a camming surface for retraction of the blades.

Positively stated, the invention contemplates the provision of blade-engaging guides the major portions whereof are concentric with the axis of rotation of said blades and maintain said blades at substantially the same radial distance of projection from said axis while rotating out of contact from said grill as during the sweep across said grill.

An essential feature of the invention is to provide guides which not only function as above-indicated, but which will also function to retract the blades on their return cycle should they be rotated while the grill is removed.

Broadly, from standpoint of the user, the invention seeks and obtains relatively quiet operation.

Other objects, advantages and beneficial constructional features will appear to persons skilled in the art to which the invention appertains as the description proceeds, both by direct recitation thereof and by implication from the context.

Referring to the accompanying drawings, in which like numerals of reference indicate similar parts throughout the several views:

Figure 1 is a view of an electric shaver of the present invention, showing the same partially in elevation and partially in section on a plane through the middle thereof and looking at the same toward what will be herein arbitrarily termed the front of the shaver;

Figure 2 is a vertical section of said shaver on line II—II of Fig. 1;

Figure 3 is a cross-sectional view of the shaving head of the shaver, as on line III—III of Fig. 1, with the scale of showing somewhat increased;

Figure 4 is a view similar to Fig. 3, but with parts omitted for more clearly showing the guide member and showing diagrammatically the constant circular path and projection of the blades during complete cycle of rotation thereof;

Figure 5 is a perspective view of the grill;

Figure 6 is a perspective view of a blade and its spring; and

Figure 7 is a perspective view of the guide member.

In the specific embodiment of the invention illustrated in said drawings, the electric shaver comprises in general a body casing 20 of appropriate size and shape for a user to conveniently hold in one hand while operating. At what will be arbitrarily termed the top or nose end of said casing is a cap 21 fitting thereon and held in place by resilient latches 22.

For convenience of description and for orienting purposes, it may be pointed out that the shaver has been illustrated in an arbitrarily selected position and the use of terms such as front and back, up and down, right and left, relate only to particular positions of parts as viewed in the drawings and are not to be considered restrictive as to construction or positioning of the shaver or its constituent parts.

Resorting to the use of such terminology, the upper or forward nose end of the cap provides an elongated opening 23 extending from proximity of one side edge to the other side edge of the cap, exposing for the entire opening area a grill 24 which is, for most of its exposed portion, a segment of a cylinder in shape and constitutes the portion of the shaver which is brought into contact with the hairy surface where shaving is to be performed in use and hereinafter referred to, for brevity, as the face of the user. Parallel to the grill opening 23, at the bottom edges of the grill next to the body casing 20 and at the front and back of said cap 21, are cleanout slots 25, the length of said slots preferably not exceeding the length of the cap opening 23 and being substantially coextensive with the length of the blades hereinafter identified and described.

Within body casing 20 is an electric motor, designated generally by numeral 26, said motor having a housing 27 and an armature shaft 28 protruding at the right side thereof. In the specific showing of the drawings, said protruding end of the armature shaft has gear teeth cut in its periphery to constitute a driving gear 29 directly rotated by said motor. Said driving gear is a prime mover in a train of gears by which continuous rotation is obtained for a rotor, designated generally by numeral 30, located within and coaxial to the curvature of grill 24. Said rotor provides a rotor shaft 31 parallel to and substantially coextensive with said motor armature shaft 28. The train of gearing includes a driven gear 32 pinned or otherwise made fast upon the rotor shaft. Driving gear 29 is in mesh with an idler gear 33 which has a pinion 34 coaxial with and fixed to it to rotate therewith. An intermediate idler gear 35 meshes with said pinion 34 and with aforementioned driven gear 32 on the rotor shaft 31. While this specific train of gears is shown and therefore described, other suitable means of driving the rotor shaft by the motor at desired speed ratio may be substituted.

As a constituent part of the shaver at the nose and thereof is an assembly referred to generally as a shaving head and of which aforementioned rotor 30 constitutes an essential element. Also as part of said shaving head there is a base plate 36 horizontally disposed and secured on the motor housing 27 across the upper end thereof. At each end of said base plate is an upstanding bracket 37 in which said rotor shaft is rotatively mounted, and at the right end there is a depending leg 38 from said base plate upon which to conveniently rotatively mount the idler gears and pinion.

Fixed with respect to said rotor shaft 31 so as to rotate therewith, are a plurality of blade-carriers 39 here shown in the form of discs which have radial projection from and are coaxial with said shaft. One convenient mode of providing and mounting blade-carriers, is to pass the shaft through a sleeve 40 the length of which is from one bracket 37 to the other, said sleeve being secured to the shaft by a transverse pin 41 through both. The sleeve is equipped, for example, with the afore-mentioned discs constituting said blade-carriers and here shown as integral with said sleeve. Furthermore, as here shown, there is a disc or blade-carrier 39 at each end of the sleeve 40 contiguous to and parallel to said brackets 37, and another or intermediate blade-carrier or disc 39 in the disclosed embodiment midway between and parallel to the two end blade-carriers, all having less diameters than the grill so as not to engage the grill.

In said blade-carriers 39 are mounted an annular series of elongated blades 42 which are approximately coextensive with the rotor shaft from proximity to one bracket 37 to proximity to the other bracket 37, all of said blades being of equal length and having corresponding spacing with respect to each other in a direction circumferentially of the rotor. Said blades are not radially disposed, but instead, all slope, say at 15°, outwardly forwardly in the direction of rotation of the rotor. The outer longitudinal edge surfaces of the blades are all correspondingly ground to effect a narrow surface engagement with the inside of the cylindrical portion of the grill, and thereby the forwardly moving edge of each blade is sharpened at an acute angle and will function both to cut and shear hair protruding through the grill into the path of revolution of said edge. The outer margin of each blade is correspondingly notched at intervals, as at 43, primarily for spanning grill-supporting ribs 44. Two of said notches 43 are at the ends of the blade for reception of retainer rings 45 carried by the two end blade-carriers 39 to limit possible outward movement of the blade when not otherwise restrained.

The blade-carriers 39 each have correspondingly disposed sloping deep grooves 47 to support and guide the blades 42, said grooves having a width commensurate with the thickness of the blade received therein and permitting the blade to have an inward and outward sliding movement therein toward and away from the grill. It is a feature of the present invention, however, to avoid any material sliding of the blades in their grooves during normal operation. Captive springs 48 supply spring loading individually to each blade, said springs urging the blades outwardly and producing the desired pressure of the blades against the cylindrical segment of the grill as each blade sweeps in a circumferential direction across said grill. The spring pressure is of course effective on the blades throughout their complete cycle of revolution. As here shown, said grooves 47 are deep enough to accommodate bow springs 48 therethrough beneath each blade and to also permit any necessary sliding of the blades for effecting desired shearing contact with the grill. Since the segment of the grill contacted by the blade during its sweep across the grill has a curvature about the same axis about which the blades are revolving, the radial projection or path of the blade remains theoretically constant. By the present invention, the blade is kept at the same radial projection throughout the entire cycle of revolution.

According to the present showing, two guide members 49 are provided for retention of the blades at the same radial projection for the remainder of the blade cycle after completing the sweep across the cylindrical segment of the grill as pertained while making such sweep. One of said guide members is situated near one end of the rotor and the other guide member is at a corresponding location near the other end of the rotor. Each guide member conveniently comprises a basal flange 50 and an upstanding web 51, said web being positioned perpendicularly to the axis of rotation of the blades and at a location to be received at its upper margin in a corresponding one of the notches 43 of the blades as they rotate. Said flange 50 rests upon and is fixed to aforementioned base plate 36 of the shaver head, as by screws 52. The web 51 extends beneath the rotor and upwardly at the front and rear thereof at least as high as the level of the axis of the rotor. The upper edge of said web is concave with a circular curvature centered coincident with the axis of the rotor, said edge being here referred to as a guide 53. The radius of curvature of said guide is equal to the radial distance from the axis of rotation of the blades to the inner ends of blade notches 43 measured when the blade is in its position of sweep against the grill. Thus when the inner end of the notch rides on said guide, the edge of the blade will have the same radial projection from the axis as it had while making the sweep in contact with the cylindrical segment of the grill. The bottoms of the cylindrical segment of the grill in effect extend as far as or overlap the upper ends of the circular guides, so that when the blades leave the guide they engage and are guided by the grill segment with a continuity of blade projection, and vice versa.

From the foregoing, it will be understood that a construction is provided which maintains the cutting or shearing edges of the blades at substantially a constant radial projection throughout the entire cycle of rotation of the blades so there will be no thumping of the blades either when coming into contact with the grill or when leaving the grill. This constancy of radial projection is illustrated somewhat diagrammatically in Fig. 4, wherein radial lines 54, 54 are shown intersecting the grill at the bottom of its circular segment, the grill diverging below those intersections so that the bottom margin of the grill spread apart for attachment in cap 21. Those same radial lines 54, 54 also intersect the circular guide 53 at about the upper ends of said guide. The rotor is indicated by arrow 55 as moving in an anti-clockwise direction. Therefore, looking at the right-hand side of Fig. 4, as the blade there shown moves upward its notch is riding on guide 53 in a circular path about axis or center 56. Just about as the blade notch passes upwardly off of guide 53, the outer edge of the blade contacts and begins to ride upon the inner surface of the grill without requiring any radial movement of the blade in making the transition. Similar action takes place at the other side as the blade passes from the cylindrical segment of the grill to the guide. The fact that the outer edges of the blades continue in the same radial projection throughout their cycle is indicated by contact of the upper blade with the cylindrical segment of the grill and by the other blades extending just to the dot-and-dash line 57 which is drawn with equal radius as the grill segment and from the same center 56 upon which the rotor rotates.

Finally, it may be remarked that as a desirable precaution, the upper ends of guide members 49 may preferably be tapered inwardly, toward and with an obtuse angle to the upper ends of guide 53, thereby providing cams 58. When cap 21 is removed, for cleaning or other purpose, the upper blades, by virtue of their spring loading, will move outwardly from their normal circle of rotation as far as permitted by retainer rings 45, and consequently, upon rotation of the rotor, would be too far out for the notches to properly engage the guide. Cams 58 are therefore provided to push the blades back under such circumstances. The cams also will take care of discrepancies in radial dimensions of the blades resulting from permitted tolerances, wear or other causes. It may also be added, that while the drawing indicates the perforate area of the grill occupies a less segment of the grill than the extent of the circular segment thereof, the invention is not to be considered as restricted thereto nor to other details of construction except as specifically recited in the following claims.

What is claimed is:

1. An electric shaver, comprising a casing, a grill having a medial segment in the form of a segment of a cylinder and having other portions flaring tangentially from said segment, said casing supporting said grill, a shaft mounted for rotation in said casing and having the axis thereof coincident with the axial line of said segment, a spring-loaded blade having a cutting edge carried by said shaft for movement of said cutting edge toward and away from said grill segment and through a rotative path determined by said grill segment during contact of said cutting edge therewith, and a guide member located within said flaring portions of said grill for maintaining said edge in said rotative path when said cutting edge is out of contact from said grill, said guide member having an arcuate guide surface centered on said axis and having ends directed toward said medial segment and terminating proximate thereto.

2. An electric shaver, comprising a casing, a grill having the form of a segment of a cylinder supported on said casing, a shaft mounted for rotation in said casing, the axis of said shaft being coincident with the axial line of said segment, a plurality of spring actuated blades carried by said shaft, each of said blades having a cutting edge for contact with said grill, rotation of said shaft causing said cutting edges of said blades to move into contact with said grill segment and through a rotative path determined by said segment, each of said blades having a notch, and a guide member fixed in said casing and disposed to be received in said notch and having an arcuate guide edge centered on said axis engaging the bottom of said notch as the blades rotate for maintaining the edges of said blades in a continuously circular rotative path of constant radius both when said edges are at the part of the rotative cycle where in contact with said grill segment and at the part of the rotative cycle where not in contact with said grill segment.

3. An electric shaver, comprising a casing, a grill having the form of a segment of a cylinder supported on said casing, a shaft mounted for rotation in said casing, the axis of said shaft being coincident with the axial line of said segment, a blade carried by and revolvable with said shaft, said blade having a cutting edge adapted to sweep across said grill segment, said blade having limited movement in a direction toward and away from said grill segment and spring-loaded for effecting engagement of said cutting edge with said grill segment in sweeping thereacross, said spring-loading maintaining said cutting edge in a circular path of transition determined by and while in sweeping engagement with said grill segment, and a guide for said blade contiguous thereto at the portion of the rotative cycle of said blade during which the blade is out of contact from said grill segment for maintaining the cutting edge in the same circular path of transition when said cutting edge is at the part of the revolving cycle out of contact from said grill as the aforesaid circular path determined by said grill segment, said grill segment and guide overlapping in their respective guiding engagement with said blade and successively maintaining a constant radius of circular path of transition of said cutting edge throughout its entire cycle of revolution.

References Cited in the file of this patent

UNITED STATES PATENTS

| | | |
|---|---|---|
| 2,220,800 | Jepson | Nov. 5, 1940 |
| 2,234,891 | Bruecker | Mar. 11, 1941 |
| 2,253,016 | Collins | Aug. 19, 1941 |
| 2,292,931 | Dicke | Aug. 11, 1942 |
| 2,331,500 | Rand | Oct. 12, 1943 |
| 2,332,405 | Smith | Oct. 19, 1943 |
| 2,688,184 | Jepson | Sept. 7, 1954 |

FOREIGN PATENTS

| | | |
|---|---|---|
| 1,003,316 | France | Nov. 14, 1951 |
| 1,050,751 | France | Sept. 9, 1953 |